United States Patent [19]

Okude et al.

[11] Patent Number: 5,270,392

[45] Date of Patent: Dec. 14, 1993

[54] HYDROXYL POLYGLYCIDYL ETHER OR ACRYLIC COPOLYMER WITH ANHYDRIDE COPOLYMER

[75] Inventors: Yoshitaka Okude, Hirakata; Akira Fushimi, Ikoma; Masakazu Watanabe, Toyonaka; Seigo Miyazoe, Suita; Koichi Hagihara, Nishinomiya; Hiroshi Miwa, Ibaragi, all of Japan

[73] Assignee: Nippon Paint Co., Ltd., Osaka, Japan

[21] Appl. No.: 680,936

[22] Filed: Apr. 5, 1991

[30] Foreign Application Priority Data

Apr. 5, 1990 [JP] Japan ................................. 2-91299

[51] Int. Cl.$^5$ ...................... C08L 33/14; C08L 63/00
[52] U.S. Cl. .................................... 525/207; 525/117
[58] Field of Search ........................ 525/117, 207, 208

[56] References Cited

U.S. PATENT DOCUMENTS

| | | | |
|---|---|---|---|
| 3,399,109 | 8/1968 | Zimmerman et al. | 525/117 |
| 3,900,440 | 8/1975 | Ohara et al. | 523/410 |
| 4,288,493 | 9/1981 | Kropp | 428/350 |
| 5,073,602 | 12/1991 | Nakao et al. | 525/514 |

OTHER PUBLICATIONS

Database WPIL, No. 8 220 424, Derwent Publications Ltd.

*Primary Examiner*—Robert E. Sellers
*Attorney, Agent, or Firm*—Wenderoth, Lind & Ponack

[57] ABSTRACT

The present invention is to improve a thermosetting composition which contains a polymer having a half-esterified acid anhydride group, thus enhancing water and weather resistance. The thermosetting resin composition comprises (I) a compound having an epoxy group and a hydroxy group, and (II) a copolymer prepared from a radically polymerizable monomer having an acid anhydride group and a copolymerizable monomer, of which said acid anhydride group is substantially completely half-esterified.

10 Claims, No Drawings

HYDROXYL POLYGLYCIDYL ETHER OR ACRYLIC COPOLYMER WITH ANHYDRIDE COPOLYMER

FIELD OF THE INVENTION

The present invention relates to a thermosetting resin composition which is used for topcoating of automobiles, coil coating, coating of electric appliances, plastics and coating of electric materials. Particularly, it relates to a thermosetting resin composition which is non-toxic and has a long pot life.

BACKGROUND OF THE INVENTION

Topcoating compositions for automobiles, which generally contain a polymer having a hydroxyl group and a melamine curing agent, have been used for years. The cured films of the compositions have poor acid resistance and may often give rise to some coating defects when exposed to acid rain which has now become serious problems. It is believed that the defects are brought about from the triazine nucleus of the melamine resin and always happen as long as the malamine resin is used as curing agent.

A coating composition which does not employ the melamine resin curing agent has also be proposed. The coating composition employs a polyisocyanate curing system, but is always associated with toxic problems due to isocyanate groups.

In order to obviate the above mentioned problems, the present inventors already proposed a thermosetting resin composition which comprises a polymer having a half-esterified acid anhydride group, a hydroxyl compound and an epoxy compound (U.S. patent application Ser. No. 389,903 corresponding to EP-A 353,734). The composition has excellent coating properties, but further improvements of water resistance and weather resistance are desired.

SUMMARY OF THE INVENTION

An object of the present invention is to improve the previously proposed thermosetting composition which contains a polymer having a half-esterified acid anhydride group, thus enhancing water and weather resistance. The present invention provides a thermosetting resin composition which comprises (I) a compound having an epoxy group and a hydroxy group, and (II) a copolymer prepared from a radically polymerizable monomer having an acid anhydride group and a copolymerizable monomer, of which said acid anhydride group is substantially completely half-esterified.

DETAILED DESCRIPTION OF THE INVENTION

The compound (I) having an epoxy group and a hydroxyl group may be low molecular weight or high molecular weight. It is preferred that the compound (I) has 2 to 10 epoxy groups, more preferably 3 to 8 epoxy groups and 2 to 12 hydroxyl groups, more preferably 4 to 10 hydroxyl groups. The compound also has an epoxy equivalent of 100 to 800, preferably 200 to 600 and a hydroxy equivalent of 200 to 1,200, preferably 400 to 1,000. Epoxy equivalents of less than 100 reduce curing ability and those of more than 800 provide too high hardness and reduce weather resistance. Hydroxy equivalents of less than 200 reduce water resistance and those of more than 1,200 reduce the solid contents of the coating composition.

The low molecular weight compound (I) has a molecular weight of less than 500 and includes a polyglycidyl ether of a polyhydric alcohol, such as trimethylolpropane diglycidyl ether, pentaerythritol diglycidyl ether and pentaerythritol triglycidyl ether. The high molecular weight compound (I) has a molecular weight of at least 500 and may be a copolymer of a radically polymerizable monomer having an epoxy group, a radically polymerizable monomer having a hydroxyl group and optionally the other radically polymerizable monomer. It is more preferred that a copolymer is prepared from a monomer composition which consists of (i) 30 to 70% by weight of a radically polymerizable monomer having an epoxy group, (ii) 10 to 50% by weight of a radically polymerizable monomer having a hydroxyl group and (iii) the balance of the other copolymerizable monomer, % being based on the total monomer amount, and has a molecular weight of 500 to 40,000. Examples of the monomers (i) are glycidyl (meth)acrylate, 3,4-epoxycyclohexylmethyl (meth)acrylate, 7-oxalicyclo{4.1.0}hept-3-ylmethyl ester with 2-oxepanone homopolymer ester with methacrylic acid and the like. Examples of the monomers (ii) are 2-hydroxyethyl (meth)acrylate, 4-hydroxybutyl (meth)acrylate, hydroxypropyl (meth)acrylate (available from Daicel Chemical Industry, Ltd. as Praccel FM-1) and the like. Examples of the other monomers (iii) are monomers not having both epoxy and hydroxyl groups, including styrene; alpha-methylstyrene; (meth)acrylic esters (e.g. methyl (meth)acrylate, ethyl (meth)acrylate, propyl (meth)acrylate, butyl (meth)acrylate, 2-ethylhexyl (meth)acrylate and lauryl (meth)acrylate); (meth)acrylamide; olefins (e.g. ethylene, propylene and butylene); mixtures thereof; and the like. The copolymerization of the monomer composition is known to the art, but generally conducted at a temperature of 100° to 140° C. for 3 to 8 hours in the presence of a radical polymerization initiator and other additives (e.g. a chain transfer agent). The radical polymerization initiator includes a peroxide (e.g. t-butylperoxy-2-ethyl hexanoate) and an azo compound (e.g. dimethyl-2,2-azobisisobutylonitrile). The initiator may be employed in an amount of 3 to 15% by weight.

The copolymer (II) of the present invention is prepared by reacting (a) a radically polymerizable monomer having an acid anhydride group and (b) a copolymerizable monomer and then substantially completely half-esterified. Examples of the radically polymerizable monomers (a) are itaconic anhydride, maleic anhydride, citraconic anhydride and the like. Examples of the copolymerizable monomers (b) are the same as listed above for the other monomers (iii). The monomer (a) may be contained in an amount of 10 to 40% by weight, preferably 15 to 30% by weight based on the total monomer amount. If styrene or alpha-methylstyrene is used in a portion of the monomer (b), it may be present in an amount of 45% by weight. If styrene or alpha-styrene is more than 45% by weight, weather resistance is poor. The copolymerization is also known to the art, but generally conducted as described for the copolymerized compound (I). The copolymer (II) preferably has a number average molecular weight of 500 to 40,000, more preferably 1,000 to 20,000, which is determined by a gel permeation chromatography using a styrene standard. Number average molecular weights of more than 40,000 increase viscosity so high that it is very difficult to increase the solid contents of the obtained resin composition. Molecular weights of less than 500 reduce curing ability. The copolymer (II) preferably contains at least 2 acid anhydride groups, more preferably 2 to 15 acid anhydride groups. If the acid anhydride groups are less than 2, the curing ability of the composition is poor. The copolymerized polymer is then substantially completely half-esterified with an alcohol. The alcohol includes a monoalcohol, such as methanol, ethanol, propanol and butanol; ethleneglycol monoalkyl ether, such as ethyleneglycol monomethyl ether and ethyleneglycol monoethyl ether; a dialkylaminoethanol; acetol; an unsaturated monoalcohol, such as allyl alcohol and propargyl alcohol; tetrahydrofurfuryl alcohol; and the like. The half-esterification is generally conducted at a temperature of room temperature to 120° C. in the presence of a catalyst. Examples of the catalysts are tirtiary amines (e.g. triethylamine and tributylamine), quaternary ammonium salts (e.g. benzyltrimethylammonium chloride, benzyltrimethylammonium bromide, benzyltributylammonium chloride, benzyltributylammonium bromide, benzyltriethylammonium chloride and tetrabutylammonium chloride) and the like.

The resin composition of the present invention may preferably contain a curing catalyst, in addition to the above mentioned components (I) and (II). The curing catalyst is one which is used for the half-esterification as listed above.

The resin composition may further contain an additional curing agent (e.g. a melamine-formaldehyde resin) in order to enhance water resistance more. For prolong pot life, an orthoester (e.g. ethyl orthoformate, methyl orthoacetate and ethyl orthoacetate) may be added to the resin composition. The resin composition may further contain additives, such as a ultraviolet absorber (e.g. Tinubin-900 available from Ciba Geigy AG and Sanol LS-292 available from Sankyo Cop.), a rheology controlling agent (e.g. microgels), a surface controlling agent, a solvent for controlling viscosity (e.g. alcohol, such as methanol, ethanol, propanol and butanol; hydrocarbons and esters).

The copolymer (II) contains an acid group which may be neutralized with amines to make it hydrophilic. The hydrophilic copolymer (II) can form an aqueous composition.

The compound (I) may be present in the composition in a number ratio of number of epoxy groups in the compound (I)/number of half-esterified acid anhydride groups in the copolymer (II) within the range of 0.5 to 1.5, particularly 0.6 to 1.2, and in a number ratio of number of hydroxyl groups in the compound (I)/number of half-esterified acid anhydride group in the copolymer (II) within the range of 0.1 to 1.5, particularly 0.3 to 1.2. If the number ratio is less than the lower limit, curing reactions are insufficient and reduce water resistance and weather resistance. If it is more than the upper limit, chemical resistance is poor. The curing catalyst may be present in the composition in an amount of 0.01 to 2.0% by weight, preferably 0.3 to 1.0% by weight. The melamine-formaldehyde resin may be formulated in an amount of 2 to 30% by weight, preferably 5 to 15% by weight based on the solid content of the resin composition. The solvent may be present in an amount of up to 60% by weight, preferably 35 to 60% by weight based on the total amount of the composition.

The thermosetting composition of the present invention contains the above mentioned two components (I), (II) and, if necessary, the curing agent, and is very suitable for molding and coating. Coating applications are very preferred, because the composition is curable at a relatively low temperature.

In case of the coating applications, the curable composition of the present invention may be formulated a clear paint or be mixed with a pigment to form an enamel paint. Preferably, where the polymer is modified with dimethylaminoethanol to form both an acid group and an amino group, the polymer is made amphoteric and has excellent pigment dispersibility. The pigment can be any conventional one, for example, iron oxide, lead oxide, strontium chromate, carbon black, coal dust, titanium oxide, talc, barium sulfate, cadmium yellow, cadmium red, chromium yellow, a metal pigment (such as aluminum flake, pearl mica), an organic pigment (such as phtharocyanine blue, Cinquacia red) and the like. The pigment content in the paint is usually expressed as a weight ratio of pigment/ nonvolatile content of the coating composition. In one embodiment of the present invention, the weight ratio can be as high as 2:1, typically is between 0.05 to 1:1.

The thermosetting resin composition may be prepared by mixing the above mentioned components using a kneader, a roll and the like.

The coating composition may be applied on a substrate by spray coating, blushing, dipping, roll coating, flow coating and the like. It is very preferred that the resin composition of the present invention is used for an overcoating composition for a wet-on-wet coating process. In the wet-on-wet coating process, a basecoating composition is applied on a substrate and then the overcoating composiiton is applied thereon without curing the basecoat. The basecoating composition may be either water based or solvent based, but if it is water based, the base coat may be dried at 60° to 120° C. for 2 to 10 minutes before coating the overcoating composition to obtain good finish.

The substrate to be employed includes wood, metal, glass, fablic, plastics, foam or various primer-coated substrate. The coating composition is very suitable for plastics or metal, such as steel and aluminum. A thickness of film can be varied, but generally is 0.5 to 3 mil. After the coating composition has been applied, it is cured. Curing can be carried out, especially 100° to 180° C., preferably 120° to 160° C. to obtain a highly crosslinked film. The time for curing is varied by the curing temperature, but is generally at 120° to 160° C. for 10 to 30 minutes.

According to the present invention, since a copolymer of which acid anhydride groups are half-esterified is employed, a reaction between the acid anhydride group and an active hydrogen containing compound does not occur and the composition can be formulated one-package. If the acid anhydride groups are not modified, they are easily reacted with an active hydrogen-containing compound at room temperature and therefore impossible to formulate one-packed composition. The curing rate of the composition can be varied by the modifier of the acid anhydride groups.

The curing system of the present invention is believed that the ring-opened, i.e. half-esterified acid anhydride groups are ring-closed at a curing temperature to reproduce acid anhydride groups which are reacted with the hydroxyl group in the compound (I) to cure. The reaction between the reproduced acid anhydride groups and the hydroxyl groups releases carboxyl groups which are then reacted with the epoxy groups in the compound (I). In this system, the curing reaction would proceed through the two functional groups (i.e. hydroxyl groups and epoxy groups) to strongly bond and form tight network which provides good weather and chemical resistances. The composition also does not employ a melamine resin and therefore is excellent acid resistance.

The composition can also be made water-borne and remove environmental pollution which is brought about from organic solvent.

EXAMPLES

The present invention is illustrated by the following examples, which, however, are not to be construed as limiting the present invention to their details. All parts and percentage in the examples are by weight unless otherwise specified.

PRODUCTION EXAMPLE 1

Preparation of a Polymer having Epoxy Groups and Hydroxyl Groups

A two liter reaction vessel equipped with a thermometer, an agitator, a condenser and a nitrogen inlet was charged with 500 parts by weight of butyl acetate and heated to 125° C. A solution containing 50 parts by weight of styrene, 400 parts by weight of glycidyl methacrylate, 350 parts by weight of 2-hydroxyethyl methacrylate, 200 parts by weight of 2-ethylhexyl acrylate and 70 parts by weight of t-butylperoxy-2-ethyl hexanoate was added dropwise and reacted at 125° C. for 30 minutes. Thereafter, 10 parts by weight of t-butylperoxy-2-ethyl hexanoate and 250 parts by weight of xylene were added dropwise for 30 minutes. After completion of the addition, it was reacted at 125° C. for 2 hours to obtain an acryl resin varnish having a nonvolatile content of 59% and a number average molecular weight of 4,000.

PRODUCTION EXAMPLES 2 TO 8

Resin varnishes were obtained as generally described in Production Example 1 but using the components shown in Table 1.

TABLE 1

|  | Production examples number | | | | | | |
|---|---|---|---|---|---|---|---|
|  | 2 | 3 | 4 | 5 | 6 | 7 | 8 |
| Xylene | 450 | 450 | 450 | 450 | — | — | — |
| Propyleneglycol monomethyl ether acetate | — | — | — | — | 500 | 500 | 500 |
| n-Butanol | 50 | 50 | 50 | 50 | — | — | — |
| Styrene | 220 | 30 | 120 | 270 | 110 | 50 | 200 |
| Glycidyl methacrylate | 320 | 400 | 400 | 500 | 320 | 550 | 360 |
| 4-Hydroxybutyl acrylate | — | — | — | 200 | — | — | — |
| 2-Hydroxyethyl methacrylate | 220 | 440 | 270 | — | — | 250 | 240 |
| 2-Ethylhexyl methacrylate | 240 | 330 | 210 | 30 | — | — | — |
| Praccel FM-1* | — | — | — | — | 410 | — | — |
| 2-Ethylhexyl methacrylate | — | — | — | — | 160 | 150 | 200 |
| t-Butylperoxy-2-ethyl hexanoate | 50 | 80 | 60 | 60 | 80 | 110 | 80 |
| Xylene | 250 | 250 | 250 | 250 | 250 | 250 | 250 |
| Epoxy equivalent | 444 | 355 | 355 | 284 | 444 | 258 | 394 |
| Hydroxy value | 590 | 295 | 481 | 720 | 595 | 520 | 540 |
| Number average molecular weight | 7,000 | 4,000 | 6,000 | 6,200 | 3,800 | 2,400 | 4,100 |

*Praccel; Hydroxypropyl (meth)acrylate available from Daicel Chemical Industry, Ltd.

PRODUCTION EXAMPLE 9

Synthesis of Copolymer A-I Containing Carboxyl Anhydride Groups

A one liter reaction vessel equipped with a thermometer, an agitator, a condenser and a nitrogen inlet was charged with 80 parts of xylene and heated to 115° C. A solution containing 25 parts by weight of styrene, 21 parts of n-butyl acrylate, 95 parts of n-butyl methacrylate, 34 parts of 2-ethylhexyl methacrylate, 50 parts of itaconic anhydride, 100 parts of propyleneglycol monomethyl ether acetate and 10 parts of t-butylperoxy-2-ethyl hexanoate was added dropwise over 3 hours and further mixed for 2 hours to obtain an acryl resin having a nonvolatile content of 53% and a number average molecular weight of 5,500.

PRODUCTION EXAMPLES 10 TO 13

Synthesis of Polymers A-II to V Containing Carboxyl Anhydride Groups

Copolymers containing carboxyl anhydride groups were obtained as generally described in Production Example 9 but using the components shown in Table 2.

TABLE 2

|  | Production examples number | | | |
|---|---|---|---|---|
|  | 10 | 11 | 12 | 13 |
| Polymer number | A-II | A-III | A-IV | A-V |
| Solvesso 100* | 100 | 66 | 100 | 100 |
| Xylene | — | — | 12 | — |
| Styrene | 30 | 10 | 68 | 40 |
| Methyl methacrylate | — | 30 | 35 | — |
| 2-Ethylhexyl acrylate | 65 | 25 | 17 | — |
| 2-Ethylhexyl methacrylate | 45 | 30 | 15 | 45 |
| Butyl acrylate | 15 | — | — | — |
| n-Butyl methacrylate | — | 45 | 25 | 15 |
| Maleic anhydride | 45 | 60 | 40 | 25 |
| Propyleneglycol monomethyl ether acetate | 90 | 120 | 80 | 50 |
| Kayer-O** | 7 | 10 | 8 | 2 |
| Nonvolatile content | 52 | 53 | 52 | 48 |
| Number-average molecular weight | 7,000 | 5,000 | 4,000 | 12,000 |

*Solvesso; An aromatic hydrocarbon solvent (available from Exxon Company)
**Kayer O; (t-Buthyl-peroxy-2-ethyl hexanoate (available from Kayaku Akzo Company)

PRODUCTION EXAMPLE 14

Preparation of a Half-Esterified Polymer A-1

A mixture of 35 parts of butyl acetate, 1.35 parts by weight of triethylamine and 18.2 parts of methanol wad added to 1,385 parts of the copolymer A-I of Production Example 9 and reacted at 40° C. for 12 hours to form a copolymer VI. It was identified by IR that the absorption at 1,785 cm$^{-1}$ of the acid anhydride groups disappeared.

PRODUCTION EXAMPLES 15 TO 20

As generally described in Production Example 14, the ingredients in Table 3 were employed to modify the copolymers A-I to V. It was identified by IR that the absorption at 1,785 cm$^{-1}$ of the acid anhydride groups disappeared.

TABLE 3

| | Production Examples | | | | | |
|---|---|---|---|---|---|---|
| | 15 | 16 | 17 | 18 | 19 | 20 |
| Resultant polymer No. | Polymer VII | Polymer VIII | Polymer IX | Polymer X | Polymer XI | Polymer XII |
| Polymer to be modified and amount (parts) | Polymer A-I 385 | Polymer A-I 385 | Polymer A-II 372 | Polymer A-III 375 | Polymer A-IV 373 | Polymer A-V 337 |
| Modifier and amount (parts) | Propargyl alcohol 30 | Acetol 36 | Acetol 37 | Methanol 22 | Methanol 15 | Methanol 10.5 |
| Trietylamine (parts) | 1.4 | 1.4 | 1.0 | 1.5 | 2.0 | 1.3 |

EXAMPLE 1

A clear paint was prepared by mixing the following ingredients.

| Ingredients | Parts |
|---|---|
| Varnish of Production Ex. 1 | 100 |
| Varnish of Production Ex. 15 (Polymer VI) | 133 |
| Tetrabutylammonium bromide | 0.3 |
| Tinuvin 900[1] | 1.2 |
| Sanol LS-299[2] | 0.6 |

[1] UV absorber available from Ciba-Geigy Company.
[2] Available from Sankyo Co., Ltd.

The obtained clear paint was diluted by a thinner of butyl acetate and xylene (1/1) to a paint viscosity. A phosphate treated steel panel was coated with Power Top U-30 and Orga P-2 (both available from Nippon Paint Co., Ltd.). Next, the panel was coated with a metallic base paint (available from Nippon Paint Co., Ltd. as Super Lack H-90) and then the above prepared clear paint was coated thereon by wet-on-wet coating and cured at 140° C. for 30 minutes. The coated film was evaluated and the results are shown in Table 4.

EXAMPLE 2

A clear paint was prepared by mixing the following ingredients.

| Ingredients | Parts |
|---|---|
| Varnish of Production Ex. 2 | 100 |
| Polymer A-VII | 130 |
| Tetrabutylammonium bromide | 0.2 |
| Tinuvin 900 | 1.3 |
| Sanol LS-292 | 0.7 |

The obtained clear paint was diluted by a thinner of butyl acetate and xylene (1/1) to a paint viscosity. A phosphate treated steel panel was coated with Power Top U-30 and Orga P-2 (both available from Nippon Paint Co., Ltd.). Next, the panel was coated with a metallic base paint (available from Nippon Paint Co., Ltd. as Super Lack H-90) and then the above prepared clear paint was coated thereon by wet-on-wet coating and cured at 140° C. for 30 minutes. The coated film was evaluated and the results are shown in Table 4.

EXAMPLE 3

A clear paint was prepared by mixing the following ingredients.

| Ingredients | Parts |
|---|---|
| Varnish of Production Ex. 2 | 100 |
| Polymer VIII | 130 |
| Tetrabutylammonium bromide | 0.3 |
| Tinuvin 900 | 1.3 |
| Sanol LS-292 | 0.7 |

The obtained clear paint was diluted by a thinner of butyl acetate and xylene (1/1) to a paint viscosity. A phosphate treated steel panel was coated with Power Top U-30 and Orga P-2 (both available from Nippon Paint Co., Ltd.). Next, the panel was coated with a metallic base paint (available from Nippon Paint Co., Ltd. as Super Lack H-90) and then the above prepared clear paint was coated thereon by wet-on-wet coating and cured at 140° C. for 30 minutes. The coated film was evaluated and the results are shown in Table 3.

EXAMPLE 4

A clear paint was prepared by mixing the following ingredients.

| Ingredients | Parts |
|---|---|
| Varnish of Production Ex. 3 | 100 |
| Polymer IX | 130 |
| Tetrabutylammonium bromide | 0.2 |
| Tinuvin 900 | 1.3 |
| Tinuvin 292 | 0.6 |

The obtained clear paint was diluted by a thinner of butyl acetate and xylene (1/1) to a paint viscosity. A phosphate treated steel panel was coated with Power Top U-30 and Orga P-2 (both available from Nippon Paint Co., Ltd.). Next, the panel was coated with a metallic base paint (available from Nippon Paint Co., Ltd. as Super Lack H-90) and then the above prepared clear paint was coated thereon by wet-on-wet coating and cured at 140° C. for 30 minutes. The coated film was evaluated and the results are shown in Table 4.

EXAMPLE 5

A clear paint was prepared by mixing the following ingredients.

| Ingredients | Parts |
| --- | --- |
| Varnish of Production Ex. 4 | 100 |
| Polymer IX | 120 |
| Benzyltetramethylammonium chloride | 0.3 |
| Tinuvin 900 | 1.3 |
| Sanol SN-292 | 0.7 |

The obtained clear paint was diluted by a thinner of butyl acetate and xylene (1/1) to a paint viscosity. A phosphate treated steel panel was coated with Power Top U-30 and Orga P-2 (both available from Nippon Paint Co., Ltd.). Next, the panel was coated with a metallic base paint (available from Nippon Paint Co., Ltd. as Super Lack H-90) and then the above prepared clear paint was coated thereon by wet-on-wet coating and cured at 140° C. for 30 minutes. The coated film was evaluated and the results are shown in Table 4.

EXAMPLE 6

A clear paint was prepared by mixing the following ingredients.

| Ingredients | Parts |
| --- | --- |
| Varnish of Production Ex. 5 | 100 |
| Polymer X | 90 |
| Tetrabutylammonium bromide | 0.1 |
| Tinuvin 900 | 1.3 |
| Sanol SL-292 | 0.7 |

The obtained clear paint was diluted by a thinner of butyl acetate and xylene (1/1) to a paint viscosity. A phosphate treated steel panel was coated with Power Top U-30 and Orga P-2 (both available from Nippon Paint Co., Ltd.). Next, the panel was coated with a metallic base paint (available from Nippon Paint Co., Ltd. as Super Lack H-90) and then the above prepared clear paint was coated thereon by wet-on-wet coating and cured at 140° C. for 30 minutes. The coated film was evaluated and the results are shown in Table 4.

EXAMPLE 7

A clear paint was prepared by mixing the following ingredients.

| Ingredients | Parts |
| --- | --- |
| Varnish of Production Ex. 7 | 100 |
| Polymer XII | 250 |
| Benzyltetramethylammonium chloride | 0.3 |
| Tinuvin 900 | 2.0 |
| Sanol SL-292 | 0.6 |

The obtained clear paint was diluted by a thinner of butyl acetate and xylene (1/1) to a paint viscosity. A phosphate treated steel panel was coated with Power Top U-30 and Orga P-2 (both available from Nippon Paint Co., Ltd.). Next, the panel was coated with a metallic base paint (available from Nippon Paint Co., Ltd. as Super Lack H-90) and then the above prepared clear paint was coated thereon by wet-on-wet coating and cured at 140° C. for 30 minutes. The coated film was evaluated and the results are shown in Table 4.

EXAMPLE 8

A clear paint was prepared by mixing the following ingredients.

| Ingredients | Parts |
| --- | --- |
| Varnish of Production Ex. 8 | 100 |
| Polymer XI | 130 |
| Tetrabutylammonium bromide | 0.2 |
| Tinuvin 900 | 1.3 |
| Sanol SL-292 | 0.7 |

The obtained clear paint was diluted by a thinner of butyl acetate and xylene (1/1) to a paint viscosity. A phosphate treated steel panel was coated with Power Top U-30 and Orga P-2 (both available from Nippon Paint Co., Ltd.). Next, the panel was coated with a metallic base paint (available from Nippon Paint Co., Ltd. as Super Lack H-90) and then the above prepared clear paint was coated thereon by wet-on-wet coating and cured at 140° C. for 30 minutes. The coated film was evaluated and the results are shown in Table 4.

TABLE 4

| | Examples | | | | | | | |
| --- | --- | --- | --- | --- | --- | --- | --- | --- |
| | 1 | 2 | 3 | 4 | 5 | 6 | 7 | 8 |
| Paint stability (40° C. × 1 week) | No defects | No defects | No defects | No defects | No defects | No defects | No defects | No defects |
| Pencil hardness | H | F | F | F | HB | HB | F | F |
| Xylene rubbing | No defects | No defects | No defects | No defects | Small scratch | Small scratch | No defects | No defects |
| Resistance to warm water (40° C. × 10 days) | No defects | No defects | No defects | No defects | Slightly mutted | Slightly mutted | No defects | No defects |
| Resistance to NaOH (0.1N, NaOH spot) | No defects | No defects | No defects | No defects | No defects | No defects | No defects | No defects |
| Resistance to acid (0.1N, H$_2$SO$_4$, 50° C. × 2 h) | No defects | No defects | No defects | No defects | No defects | No defects | No defects | No defects |
| Appearance[1] | 1.0 | 1.0 | 1.0 | 1.0 | 0.9 | 1.0 | 0.9 | 1.0 |

[1]determined by PGD values using a portable distinctive gloss meter available from Totyo Koden Co., Ltd.

What is claimed is:
1. A thermosetting resin composition comprising:
   (I) a compound having 2 to 10 epoxy groups and 2 to 12 hydroxyl groups and having a number average molecular weight of at least 500, and
   (II) a copolymer prepared from a radically polymerizable monomer having an acid anhydride group and a copolymerizable monomer, of which said acid anhydride group is half-esterified.

2. The thermosetting resin composition according to claim 1 wherein said compound (I) has an epoxy equivalent of 100 to 800 and a hydroxy equivalent of 200 to 1,200.

3. The thermosetting resin composition according to claim 1 wherein said compound (I) has a number average molecular weight of at least 500 and prepared from a monomer composition which consists of (i) 30 to 70% by weight of a radically polymerizable monomer having an epoxy group(s), (ii) 10 to 50% by weight of a radically polymerizable monomer having a hydroxyl group and (iii) the balance being copolymerizable monomer(s) other than monomers (i) and (ii), the percentage by weight being based on the total monomer amount.

4. The thermosetting resin composition according to claim 1 wherein said copolymer (II) is prepared by reacting (a) a radically polymerizable monomer having an acid anhydride group and (b) a copolymerizable monomer which includes a monomer selected from the group consisting of styrene, alpha-methylstyrene, (meth)acrylic esters, (meth)acrylamide and olefins and then wherein the acid anhydride group is half-esterified.

5. The thermosetting resin composition according to claim 4 wherein said radically polymerizable monomer (a) is selected from the group consisting of itaconic anhydride, maleic anhydride and citraconic anhydride.

6. The thermosetting resin composition according to claim 4 wherein said monomer (a) is contained in an amount of 10 to 40% by weight based on the total monomer amount.

7. The thermosetting resin composition according to claim 1 wherein said copolymer (II) has a number average molecular weight of 500 to 40,000, determined by a gel permeation chromatography using a styrene standard.

8. The thermosetting resin composition according to claim 1 wherein said half-esterification is conducted with an alcohol.

9. The thermosetting resin composition according to claim 1 wherein said compound (I) is present in the composition in a number ratio of number of epoxy groups in the compound (I)/number of half-esterified acid anhydride groups in the copolymer (II) within the range of 0.5 to 1.5, and in a number ratio of number of hydroxyl groups in the compound (I)/number of half-esterified acid anhydride group in the copolymer (II) within the range of 0.1 to 1.5.

10. The thermosetting resin according to claim 1 wherein the acid anhydride group is completely half-esterified.

* * * * *